United States Patent
Cai et al.

(10) Patent No.: US 11,308,871 B2
(45) Date of Patent: Apr. 19, 2022

(54) OLED DRIVE POWER SUPPLY AND OLED TELEVISION

(71) Applicant: SHENZHEN SKYWORTH-RGB ELECTRONIC CO., LTD, Guangdong (CN)

(72) Inventors: Shengping Cai, Shenzhen (CN); Zongwang Wei, Shenzhen (CN); Jianhua Zhou, Shenzhen (CN); Zhenyu Guo, Shenzhen (CN); Qifeng Dai, Shenzhen (CN)

(73) Assignee: SHENZHEN SKYWORTH-RGB ELECTRONIC CO., LTD, Guangdong (CN)

( * ) Notice: Subject to any disclaimer, the term of this patent is extended or adjusted under 35 U.S.C. 154(b) by 38 days.

(21) Appl. No.: 17/058,323

(22) PCT Filed: Jun. 28, 2019

(86) PCT No.: PCT/CN2019/093449
§ 371 (c)(1),
(2) Date: Nov. 24, 2020

(87) PCT Pub. No.: WO2020/048196
PCT Pub. Date: Mar. 12, 2020

(65) Prior Publication Data
US 2021/0210008 A1 Jul. 8, 2021

(30) Foreign Application Priority Data

Sep. 7, 2018 (CN) .......................... 201811043681.4

(51) Int. Cl.
*H05B 45/355* (2020.01)
*G09G 3/3208* (2016.01)
*H02M 1/42* (2007.01)

(52) U.S. Cl.
CPC ........ *G09G 3/3208* (2013.01); *H02M 1/4208* (2013.01); *G09G 2330/02* (2013.01)

(58) Field of Classification Search
CPC .... H05B 45/355; H05B 45/382; H05B 45/39; G09G 3/3208; G09G 2330/026;
(Continued)

(56) References Cited

U.S. PATENT DOCUMENTS

| 2017/0006688 A1* | 1/2017 | Dai ........................ H02M 7/04 |
| 2017/0231041 A1* | 8/2017 | Yang .................... H05B 45/385 |

(Continued)

FOREIGN PATENT DOCUMENTS

| CN | 1889805 A | 1/2007 |
| CN | 202795995 A | 3/2013 |

(Continued)

OTHER PUBLICATIONS

International Search Report dated Sep. 17, 2019 in corresponding International application No. PCT/CN2019/093449; 5 pages.

*Primary Examiner* — Dennis P Joseph
(74) *Attorney, Agent, or Firm* — Maier & Maier, PLLC (57) ABSTRACT

An OLED drive power supply includes a power supply board connected to a main board and OLED screen, the power supply board includes a power supply circuit, first conversion module, second conversion module and switch; after powering on, the power supply circuit starts the first conversion module to output high-voltage DC to second conversion module, output first voltage and second voltage to power main board, switch converts first voltage to first enabling voltage to power OLED screen; after preset time, main board outputs second enabling signal to power supply circuit, to control second conversion module to start and output second enabling voltage to power and light OLED screen, first conversion module comprises bridgeless PFC (Continued)

circuit and auxiliary path LLC control circuit integrated into same semiconductor chip encapsulation, and omitting specific standby circuit, circuit structure is simplified, area of power supply board is reduced, and production cost is reduced.

15 Claims, 5 Drawing Sheets

(58) Field of Classification Search
CPC .... H02M 3/015; H02M 3/285; H02M 1/4208; H02M 1/4225; H02M 1/007; Y02B 70/10
See application file for complete search history.

(56) References Cited

U.S. PATENT DOCUMENTS

2020/0321854 A1* 10/2020 Joo ..................... H02M 1/4225
2020/0328671 A1* 10/2020 Li ....................... H02M 3/1582

FOREIGN PATENT DOCUMENTS

| | | |
|---|---|---|
| CN | 106409220 A | 2/2017 |
| CN | 109166519 A | 1/2019 |

* cited by examiner

OLED DRIVE POWER SUPPLY AND OLED TELEVISION

CROSS-REFERENCES TO RELATED APPLICATIONS

This application is a national stage application of PCT Patent Application No. PCT/CN2019/093449, filed on 28 Jun. 2019, which claims priority to Chinese Patent Application No. 201811043681.4, filed on 7 Sep. 2018, the content of all of which is incorporated herein by reference.

FIELD

The present disclosure relates to the technical field of power supply, and, more particularly, to an OLED drive power supply and an OLED television.

BACKGROUND

An OLED (Organic Light Emitting Diode), due to a plurality of advantages including no need of backlight, no need of color filter and no need of liquid crystal, as well as being able to emit light by itself, and being superior to a traditional LCD and LED in a plurality of terms, including image quality, response speed, thickness, visual angle and more, has a relatively wide application in recent years. Following a gradual maturation of an OLED technology, a television taking an OLED as a display scheme will replace the traditional LCD and LED television gradually, meanwhile, an OLED television, comparing to the traditional LCD and LED television, not only has a qualitative leap in image quality, but also has the characteristics of thin thickness, flexibility and more. Due to an existing OLED television, compared to the traditional LCD and LED, has a higher requirement on a time sequence of a power and a relatively higher power, thus the volume of a power supply board is pretty large.

Figure 1:
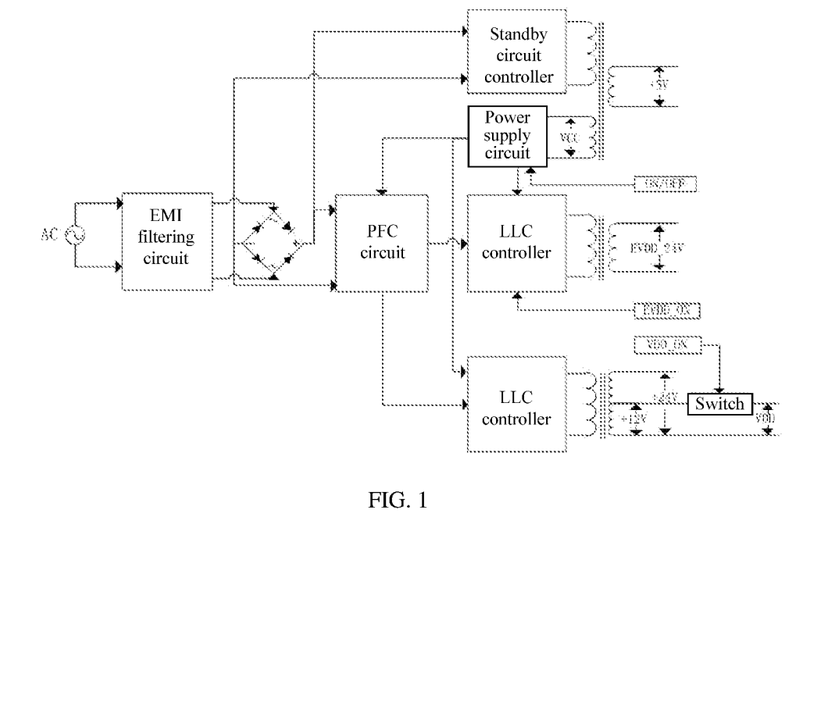
FIG. 1 illustrates a structural schematic diagram of an existing OLED drive power supply.
Figure 2:
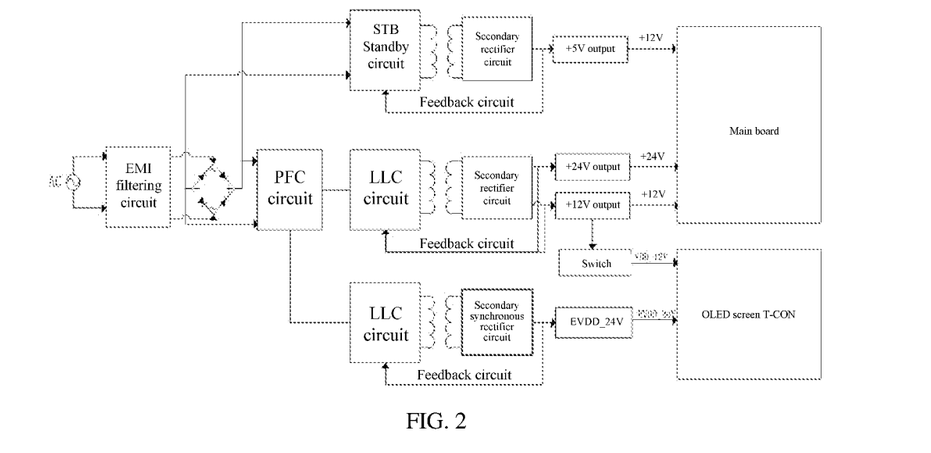
FIG. 2 illustrates a schematic diagram on a power supply circuit for an existing OLED drive power supply.

In addition, referencing to FIG. 1 and FIG. 2, an existing OLED drive power supply usually adopts a multi-path independent control output, all main circuits are mutually independent and controlled by a mainboard signal, wherein a standby circuit outputs 5V to supply power to a mainboard, and an auxiliary winding supplies power to a PFC circuit, an auxiliary path LLC controller and a main LLC controller respectively through an output power supply of a power supply circuit. When a television is powered on, an existing output 5V supplies power to a mainboard, and after the mainboard starts to work, enable the main circuit to output in a sequence according to a certain time sequence. When in a standby starts, the mainboard receives a standby signal, and turns off the output from the main circuit according to a certain time sequence in a sequence, before entering a standby state. An architecture of the drive power supply, wherein an output of each circuit is mutually independent, a relationship between each circuit is definite and a logic is clear, very convenient to a time sequence control, but an overall architecture is relatively complex.

Therefore, the current technology needs to be improved and developed.

SUMMARY

According to the above described defects, the purpose of the present disclosure is providing an OLED drive power supply and an OLED television, by integrating a bridgeless PFC and an auxiliary path LLC control circuit into a control chip, and omitting a special standby circuit, a requirement of the OLED television on a power output stability and a timing control is met, and a circuit structure is optimized, an area of a power supply board is reduced, and a production cost is reduced.

A technical solution of the present disclosure to solve the above technical problems is as follows:

An OLED drive power supply, comprising a power supply board connected with a mainboard and an OLED screen, wherein the power supply board comprises a power supply circuit, a first conversion module, a second conversion module and a switch;

after powering on, the power supply circuit starts the first conversion module according to an on-off signal output from the mainboard, the first conversion module outputs a high-voltage direct current to the second conversion module, the first conversion module outputs a first voltage and a second voltage to supply power to the mainboard, and the switch converts the first voltage into a first enabling voltage before outputting to the OLED screen for power, according to a first enabling signal output from the mainboard; after a preset time, the mainboard outputs a second enabling signal to the power supply circuit, the power supply circuit controls the second conversion module to start according to the second enabling signal, the second conversion module converts the high-voltage direct current into a second enabling voltage to supply power to and light up the OLED screen;

the first conversion module comprises a bridgeless PFC circuit and an auxiliary path LLC control circuit integrated in a same semiconductor chip package, the bridgeless PFC circuit starts and outputs a high-voltage direct current to the auxiliary path LLC control circuit, the auxiliary path LLC control circuit converts the high-voltage direct current into the first voltage and the second voltage before outputting to the mainboard for power.

The OLED drive power supply, wherein the power supply circuit comprises an on-off control circuit and an enabling switching circuit, the on-off control circuit outputs a first power to start the bridgeless PFC circuit according to the on-off signal output from the mainboard, and outputs a second power to the auxiliary path LLC control circuit for power, and outputs a third power to the enabling switching circuit for power according to the high-voltage direct current output from the bridgeless PFC circuit; the enabling switching circuit converts the third power into a fourth power before outputting to the second conversion module according to the second enabling signal output from the mainboard.

The OLED drive power supply, wherein the auxiliary path LLC control circuit comprises an auxiliary path LLC controller and a first transformer, the auxiliary path LLC controller starts the first transformer according to the second power output from the on-off control circuit, and the first transformer converts the high-voltage direct current output from the bridgeless PFC circuit into the first voltage and the second voltage before outputting to the mainboard.

The OLED drive power supply, wherein the second conversion module comprises a main LLC controller and a second transformer, the main path LLC controller starts the second transformer according to the fourth power output from the enabling switching circuit, the second transformer converts the high-voltage direct current output from the bridgeless PFC circuit into the second enabling voltage to power the OLED screen.

The OLED drive power supply, wherein the on-off control circuit comprises a first control sub-circuit and a second control sub-circuit, the first control sub-circuit outputs the first power to start the bridgeless PFC circuit according to the on-off signal output from the mainboard, and outputs the second power to the auxiliary path LLC control circuit, and the second control sub-circuit outputs the third power to the enabling switching circuit according to the high-voltage direct current output from the bridgeless PFC circuit.

The OLED drive power supply, wherein the auxiliary path LLC control circuit further comprises a standby step-down circuit, applied for controlling a magnitude of the first voltage and the second voltage output to the mainboard according to the on-off signal.

The OLED drive power supply, wherein the standby step-down circuit comprises a first diode, a first resistor, a second resistor, a third resistor, a fourth resistor, a fifth resistor, a sixth resistor, a seventh resistor, an eighth resistor, a ninth resistor, a tenth resistor, a first capacitor, a second capacitor, a third capacitor, a first triode, a first shunt reference source and a first optical coupler;

an anode of the first diode connects to the mainboard, a cathode of the first diode connects to one end of the second resistor, one end of the first capacitor and a base of the first triode through the first resistor; another end of the second resistor, another end of the first capacitor and an emitter of the first triode are all grounded; a collector of the first triode connects to one end of the fourth resistor, one end of the fifth resistor, one end of the sixth resistor, a feedback pin of the first shunt reference source, one end of the second capacitor, one end of the third capacitor and one end of the seventh resistor through the third resistor; another end of the fourth resistor connects to the mainboard, another end of the seventh resistor connects to the OLED screen and one end of the tenth resistor; another end of the fifth resistor, another end of the sixth resistor and a positive electrode of the first shunt reference source are all grounded; a negative electrode of the first shunt reference source connects to another end of the second capacitor, one end of the eighth resistor, one end of the ninth resistor and a second pin of the first optical coupler; another end of the eighth resistor connects to another end of the third capacitor; another end of the ninth resistor connects to another end of the tenth resistor and a first pin of the first optical coupler; a third pin of the first optical coupler is grounded, and a fourth pin of the first optical coupler connects to the mainboard.

The OLED drive power supply, wherein the first control sub-circuit comprises a second diode, a first Zener diode, a second Zener diode, a second triode, a third triode, a fourth triode, an eleventh resistor, a twelfth resistor, a thirteenth resistor, a fourteenth resistor, a fifteenth resistor, a sixteenth resistor, a seventeenth resistor, an eighteenth resistor, a fourth capacitor, a fifth capacitor, a sixth capacitor and a second optical coupler;

an anode of the second diode connects to the mainboard, a cathode of the second diode connects to one end of the twelfth resistor, one end of the fourth capacitor and a base of the second triode through the eleventh resistor, another end of the twelfth resistor, another end of the fourth capacitor and an emitter of the second triode are all grounded; a third pin of the second optical coupler connects to one end of the sixteenth resistor, an anode of the first Zener diode and a base of the third triode through the fifteenth resistor; a fourth pin of the second optical coupler connects to a collector of the third triode and the auxiliary path LLC control circuit; an emitter of the third triode connects to a collector of the fourth triode and one end of the eighteenth resistor; another end of the eighteenth resistor connects to one end of the seventeenth resistor, a base of the fourth triode and a cathode of the second Zener diode; another end of the sixteenth resistor, an anode of the first Zener diode, another end of the fifth capacitor, another end of the seventeenth resistor, an anode of the second Zener diode and one end of the sixth capacitor are all grounded; an emitter of the fourth triode connects to the bridgeless PFC circuit, the second control sub-circuit and another end of the sixth capacitor.

The OLED drive power supply, wherein the second control sub-circuit comprises a nineteenth resistor, a twentieth resistor, a twenty-first resistor, a twenty-second resistor, a twenty-third resistor, a twenty-fourth resistor, a twenty-fifth resistor, a twenty-sixth resistor, a twenty-seventh resistor, a fifth triode, a third diode, a fourth diode, a fifth diode, a seventh capacitor, an eighth capacitor, a ninth capacitor and a second shunt reference source;

an emitter of the fifth triode connects to the first control sub-circuit, further connects to one end of the twentieth resistor and a negative electrode of the second shunt reference source through the nineteenth resistor; a base of the fifth triode connects to a negative electrode of the second shunt reference source through the twentieth resistor; a collector of the fifth triode connects to an anode of the fifth diode, further connects to an anode of the third diode through the twenty-first resistor, a cathode of the fifth diode connects to the enabling switching circuit; a cathode of the third diode connects to a cathode of the fourth diode, a feedback pin of the second shunt reference source, and further getting grounded through the seventh capacitor; a positive electrode of the second shunt reference source is grounded; an anode of the fourth diode connects to one end of the twenty-third resistor, one end of the eighth capacitor, one end of the ninth capacitor and one end of the twenty-fourth resistor through the twenty-second resistor; another end of the twenty-third resistor, another end of the eighth capacitor and another end of the ninth capacitor are all grounded; another end of the twenty-fourth resistor connects sequentially to the twenty-fifth resistor, the twenty-sixth resistor and the twenty-seventh resistor in series before connecting to the bridgeless PFC circuit;

The OLED drive power supply, wherein the enabling switching circuit comprises a sixth diode, a twenty-eighth resistor, a twenty-ninth resistor, a thirtieth resistor, a thirty-first resistor, a thirty-second resistor, a tenth capacitor, a sixth triode, a seventh triode, a third Zener diode and a third optical coupler; an anode of the sixth diode connects to the mainboard, a cathode of the sixth diode connects to one end of the twenty-ninth resistor, one end of the tenth capacitor and a base of the sixth triode through the twenty-eighth resistor, another end of the twenty-ninth resistor, another end of the seventh resistor and an emitter of the sixth triode are all grounded; a collector of the sixth triode connects to a second pin of the third optical coupler, and a first pin of the third optical coupler connects to the on-off control circuit through the thirtieth resistor, a third pin of the third optical coupler connects to one end of the thirty-second resistor, a cathode of the third Zener diode and a base of the seventh triode through the thirty-first resistor, a fourth pin of the third optical coupler connects to the on-off control circuit and a collector of the seventh triode; an emitter of the seventh triode connects to the second conversion module, while another end of the thirty-second resistor and an anode of the third Zener diode are both grounded.

The OLED drive power supply, wherein, a model of the first optical coupler is BPC-817C.

The OLED drive power supply, wherein the second triode, the third triode and the fourth triode are all NPN triodes.

The OLED drive power supply, wherein the fifth triode is a PNP triode.

The OLED drive power supply, wherein the sixth triode and the seventh triode are both NPN triodes.

An OLED television, wherein comprising the OLED drive power supply described above.

Comparing to the prior art, the present disclosure provides a OLED drive power supply and an OLED television, the OLED drive power supply comprises a power supply board connected with a mainboard and an OLED screen, the power board comprises a power supply circuit, a first conversion module, a second conversion module and a switch. After powering on, the power supply circuit starts the first conversion module, to output a high-voltage direct current to the second conversion module, and output a first voltage and a second voltage to the mainboard for power, and the switch converts the first voltage into the first enabling voltage to the OLED screen for power; after a preset time, the mainboard outputs a second enabling signal to the power supply circuit, and the power supply circuit, to control the second conversion module to start outputting a second enabling voltage to power and light up the OLED screen; wherein the first conversion module comprises a bridgeless PFC circuit and an auxiliary path LLC control circuit integrated in a same semiconductor chip package. By integrating the bridgeless PFC and the auxiliary path LLC control circuit into one control chip, and omitting a special standby circuit, a circuit structure is optimized, an area of the power supply board is reduced, and a production cost is reduced.

DETAILED DESCRIPTION OF EMBODIMENTS

According to the above described defects, the purpose of the present disclosure is providing an OLED drive power supply and an OLED television, by integrating a bridgeless PFC and an auxiliary path LLC control circuit into a control chip, and omitting a special standby circuit, at a same time of satisfying a requirement of the OLED television on a power output stability and a timing control, a circuit structure is optimized, an area of the power supply board is reduced, and a production cost is reduced.

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

The OLED drive power supply provided by the present disclosure is suitable for a plurality of display related power supply drive adopting an organic light emitting diode (OLED) as a display scheme, including a television, a monitor, an electric teaching, a back projection plasma display and more.

Embodiment 1

Figure 3:
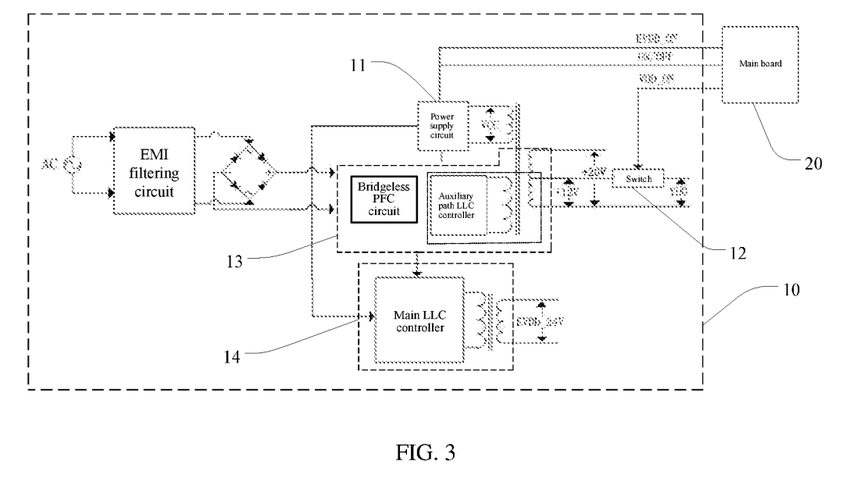
FIG. 3 illustrates a structural schematic diagram of an OLED driving power supply provided by the present disclosure.
Figure 4:
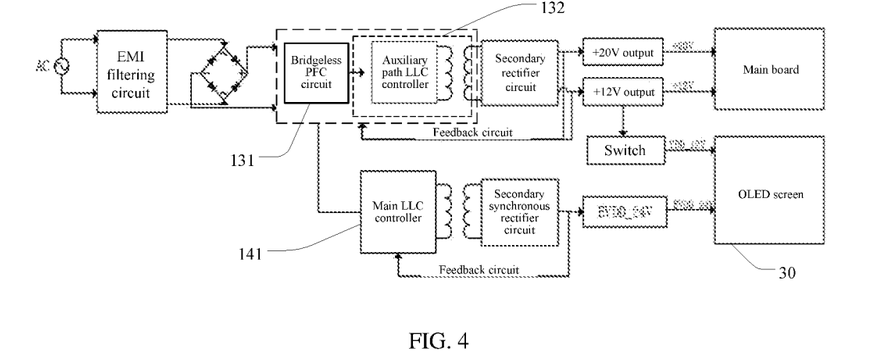
FIG. 4 illustrates a structural schematic diagram on a power supply circuit of the OLED drive power supply provided by the present disclosure.

Referring to FIG. 3 and FIG. 4, the OLED drive power supply provided by the present disclosure comprises a power supply board 10 connected with a mainboard 20 and an OLED screen 30, wherein the power supply board 10 comprises a power supply circuit 11, a first conversion module 13, a second conversion module 14 and a switch 12. The power supply circuit 11 connects to the mainboard 20, the first conversion module 13 and the second conversion module 14, the first conversion module 13 connects to the second conversion module 14 and the switch 12, while the switching module and the second conversion module 14 further connect to the OLED screen 30. After powering on, the power supply circuit 11 starts the first conversion module 13 according to an on-off signal ON/OFF output from the mainboard 20, the first conversion module 13 outputs a high-voltage direct current HV-DC to the second conversion module 14, the first conversion module 13 outputs a first voltage (+12V in the present embodiment) and a second voltage (+20V in the present embodiment) to supply power to the mainboard 20, and the switch 12 converts the first voltage +12V into a first enabling voltage (VDD_12V in the present embodiment) before outputting to the OLED screen 30 for power, according to a first enabling signal VDD_ON output from the mainboard 20; after a preset time, the mainboard 20 outputs a second enabling signal EVDD_ON to the power supply circuit 11, the power supply circuit 11 controls the second conversion module 14 to start according to the second enabling signal EVDD_ON, the second conversion module 14 converts the high-voltage direct current HV_DC into a second enabling voltage (EVDD_24V in the present embodiment) to supply power to the OLED screen 30, thus lighting up the OLED screen 30.

Wherein the first conversion module 13 comprises a bridgeless PFC circuit 131 and an auxiliary path LLC control circuit 132 integrated in a same semiconductor chip package, the bridgeless PFC circuit 131 starts and outputs a high-voltage direct current HV-DCHV-DC to the auxiliary path LLC control circuit 132, the auxiliary path LLC control circuit 132 converts the high-voltage direct current HV-DCHV-DC into the first voltage +12V and the second voltage +20V before outputting to the mainboard 20 for power. By integrating the bridgeless PFC circuit 131 and the auxiliary path LLC control circuit 132 into one control chip, and omitting a special standby circuit, at a same time of satisfying a requirement of the OLED television on a power output stability and a timing control, a circuit structure is optimized, an area of the power supply board 10 is reduced, and a production cost is reduced.

Further, the power supply circuit 11 comprises an on-off control circuit (not shown in the FIG.s) and an enabling switching circuit (not shown in the FIG.s). The on-off control circuit connects to the mainboard 20, the bridgeless PFC circuit 131, the auxiliary path LLC control circuit 132 and the enabling switching circuit, the enabling switching circuit further connects with the second conversion module 14. The on-off control circuit outputs a first power PFC_VCC to start the bridgeless PFC circuit 131 according to the on/off signal ON/OFF output from the mainboard 20, outputs a second power VCC_VDD to the auxiliary path LLC control circuit 132 for power, and outputs a third power PWM_VCC to power the enabling switching circuit according to the high voltage direct current HV-DC output from the bridgeless PFC circuit 131; the enabling switching circuit converts the third power PWM_VCC into a fourth power VCC_EVDD and output to the second conversion module 14 according to the second enabling signal EVDD-ON output from the mainboard 20, that is, providing an electric energy for operation to the bridgeless PFC circuit 131, the auxiliary path LLC control circuit 132 and the main LLC control circuit, through the on-off control circuit and the enabling switching circuit, and controlling to make an orderly work, further satisfying a plurality of requirements of an OLED television on a power supply stability and a timing performance.

In a specific implementation, the on-off control circuit comprises a first control sub-circuit and a second control sub-circuit, the first control sub-circuit connects to the bridgeless PFC circuit 131, the auxiliary path LLC control circuit 132, and the mainboard 20. The second control sub-circuit connects to the first control sub-circuit, the bridgeless PFC circuit 131 and the enabling switching circuit. The first control sub-circuit outputs the first power PFC_VCC to start the bridgeless PFC circuit 131 according to the on-off signal ON/OFF output from the mainboard 20, and outputs the second power VCC_VDD to power the auxiliary path LLC control circuit 132, and the second control sub-circuit outputs the third power PWM_VCC to the enabling switching circuit according to the high-voltage direct current HV-DC output from the bridgeless PFC circuit 131. By using the first control sub-circuit and the second control sub-circuit to realize an effective control of supplying power to each circuit, a working stability between each circuit is ensured.

Figure 5:
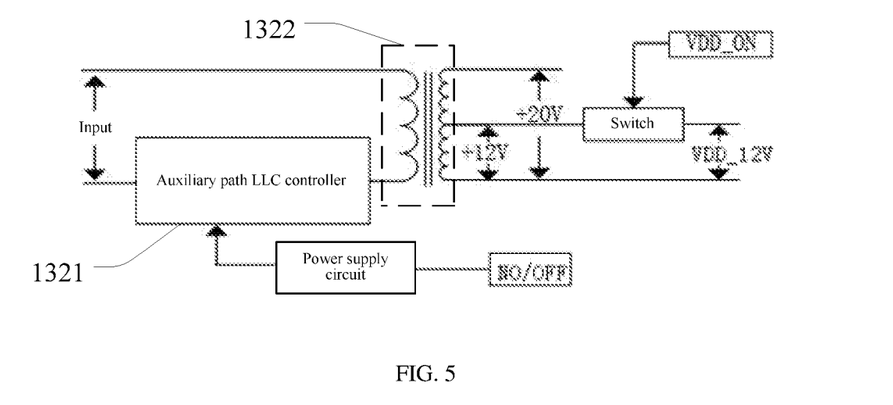
FIG. 5 illustrates a structural block diagram on an auxiliary path LLC control circuit and a power supply circuit of the OLED drive power supply provided by the present disclosure.
Figure 6:
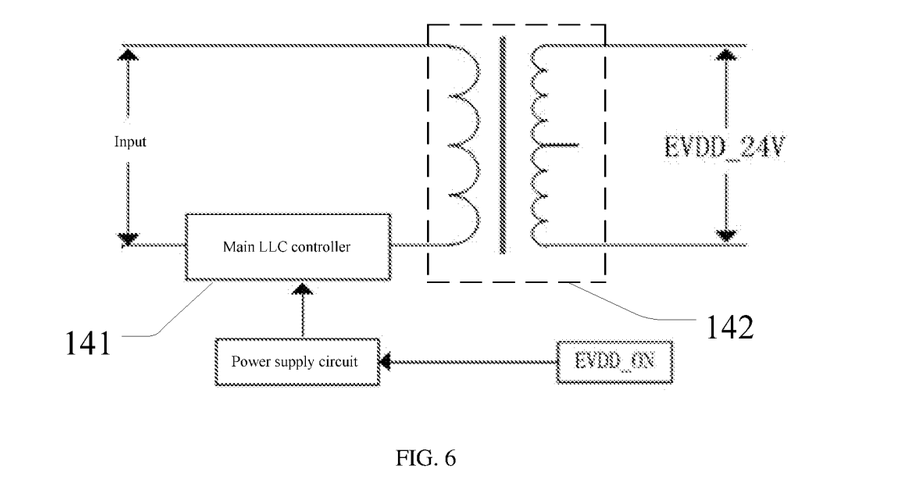
FIG. 6 illustrates a structural block diagram on a second conversion module and a power supply circuit of the OLED drive power supply provided by the present disclosure.

Further, referencing to FIG. 5 and FIG. 6 together, the auxiliary path LLC control circuit 132 comprises an auxiliary path LLC controller 1321 and a first transformer 1322, the auxiliary path LLC controller 1321 connects to the power supply circuit 11, while the first transformer 1322 connects to the auxiliary path LLC controller 1321 and the mainboard 20. The auxiliary path LLC controller 1321 starts the first transformer 1322 according to the second power VCC_VDD output from the on-off control circuit, and the first transformer 1322 converts the high-voltage direct current HV-DC output from the bridgeless PFC circuit 131 into the first voltage +12V and the second voltage +20V, before outputting to the mainboard 20. By the auxiliary path LLC control circuit 132 outputting the first voltage +12V and the second voltage +20V simultaneously to the mainboard 20, a normal operation of the mainboard 20 is ensured, while the switch 12 converts the first voltage +12V into the first enabling voltage VDD_12V, before outputting to the OLED screen 30.

Further, since the OLED screen 30 requires a control of both the first enabling voltage VDD_12V and the second enabling voltage EVDD_24V to get light, thus the second conversion module 14 in the present disclosure comprises a main LLC controller 141 and a second transformer 142, the main LLC controller 141 connects to the power supply circuit 11, the second transformer 142 connects to the main LLC controller 141 and the mainboard 20, the main LLC controller 141 starts the second transformer 142 according to the fourth power VCC_EVDD output from the enabling switching circuit, and the second transformer 142 converts the high-voltage direct current HV-DC output from the bridgeless PFC circuit 131 to the second enabling voltage EVDD_24V to supply power to the OLED screen 30.

Furthermore, due to the mainboard 20 in the present disclosure is directly powered by 12V, the main circuit needs to keep working during a standby, while an original standby has only a 5V output. And under a same load, the higher the voltage is, the larger the loss is. Therefore, to solve a problem of a large standby power consumption, the auxiliary path LLC control circuit 132 further comprises a standby step-down circuit, applied for controlling a magnitude of the first voltage +12V and the second voltage +20V output to the mainboard 20 according to the on/off signal ON/OFF, when the on-off signal ON/OFF is low (i.e., a shutdown signal), the standby step-down circuit controls the first voltage +12V and the second voltage +20V to drop to a 10V and 18V output, respectively, to reduce a standby loss. At a same time, the present disclosure further avoids the problem of a high loss by selecting a control IC having a very low standby loss, which has an auto standby function. By a plurality of corresponding arrangement, the circuit can be enabled to enter a burst mode during the standby, and achieving a purpose of reducing the standby power consumption.

Figure 7:
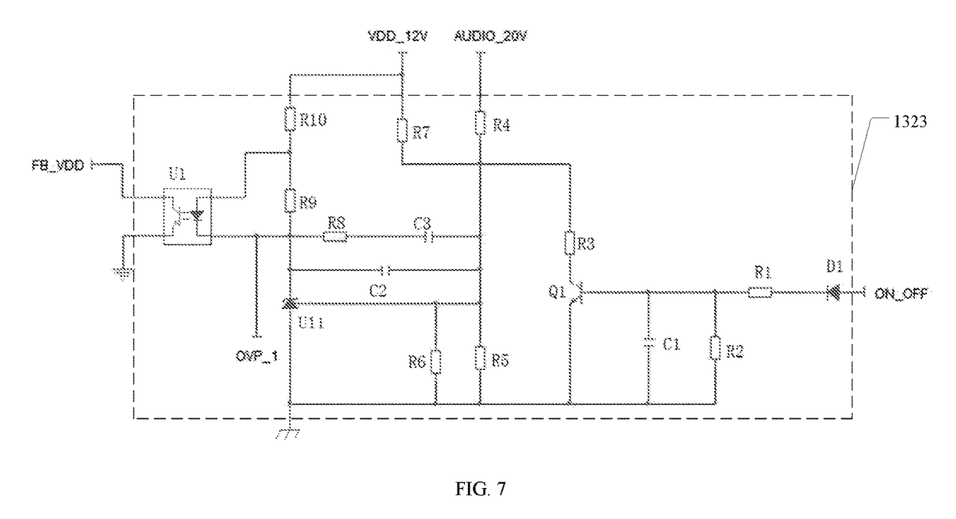
FIG. 7 illustrates a circuit diagram on a standby step-down circuit in the OLED drive power supply provided by the present disclosure.

Specifically, referencing to FIG. 7, a standby step-down circuit 1323 comprises a first diode D1, a first resistor R1, a second resistor R2, a third resistor R3, a fourth resistor R4, a fifth resistor R5, a sixth resistor R6, a seventh resistor R7, an eighth resistor R8, a ninth resistor R9, a tenth resistor R10, a first capacitor C1, a second capacitor C2, a third capacitor C3, a first triode Q1, a first shunt reference source U11 and a first optical coupler U1.

An anode of the first diode D1 connects to the mainboard 20, a cathode of the first diode D1 connects to one end of the second resistor R2, one end of the first capacitor C1 and a base of the first triode Q1 through the first resistor R1; another end of the second resistor R2, another end of the first capacitor C1 and an emitter of the first triode Q1 are all grounded; a collector of the first triode Q1 connects to one end of the fourth resistor R4, one end of the fifth resistor R5, one end of the sixth resistor R6, a feedback pin of the first shunt reference source U11, one end of the second capacitor C2, one end of the third capacitor C3 and one end of the seventh resistor R7 through the third resistor R3; another end of the fourth resistor R4 connects to the mainboard 20, another end of the seventh resistor R7 connects to the OLED screen 30 and one end of the tenth resistor R10; another end of the fifth resistor R5, another end of the sixth resistor R6 and a positive electrode of the first shunt reference source U11 are all grounded; a negative electrode of the first shunt reference source U11 connects to another end of the second capacitor C2, one end of the eighth resistor R8, one end of the ninth resistor R9 and a second pin of the first optical coupler U1; another end of the eighth resistor R8 connects to another end of the third capacitor C3; another end of the ninth resistor R9 connects to another end of the tenth resistor R10 and a first pin of the first optical coupler U1; a third pin of the first optical coupler U1 is grounded, and a fourth pin of the first optical coupler U1 connects to the mainboard 20.

In a startup state, the on/off signal ON/OFF is pulled high, the first triode Q1 is turned on, a resistance value of the feedback pin of the first shunt reference source U11 is a connection in parallel of the third resistor R3, the fifth resistor R5 and the sixth resistor R6, while outputting a normal voltage; when in a shutdown state, the on/off signal ON/OFF is pulled low, the first triode Q1 is turned off, the resistance value of the feedback pin of the first shunt reference source U11 is a connection in parallel of the fifth resistor R5 and the sixth resistor R6, the resistance is reduced, and the output voltage is reduced to about 10.5 V, thus the standby loss is reduced, making the system be able to work normally. The first triode Q1 is an NPN triode, and the model of the first optical coupler U1 is BPC-817C.

Figure 8:
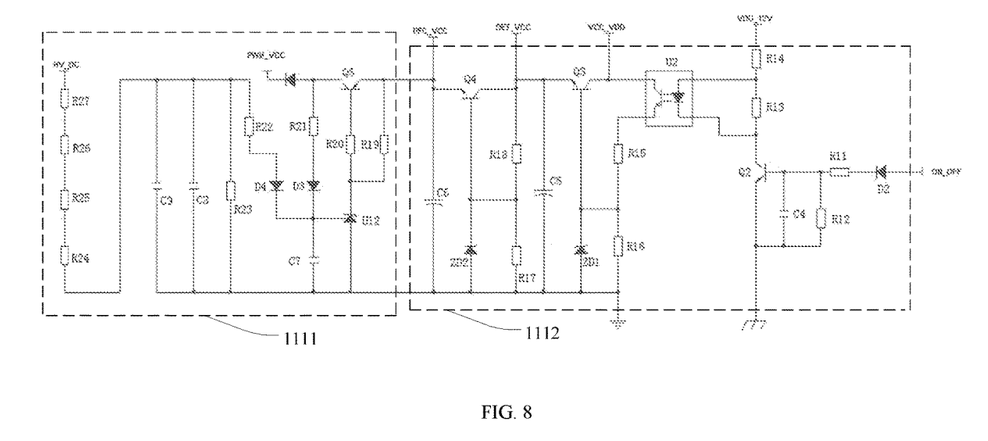
FIG. 8 illustrates a circuit diagram on an on-off control circuit in the OLED drive power supply provided by the present disclosure.

Further, referencing to FIG. 8, the first control sub-circuit 1111 comprises a second diode D2, a first Zener diode ZD1, a second Zener diode ZD2, a second triode Q2, a third triode Q3, a fourth triode Q4, an eleventh resistor R11, a twelfth resistor R12, a thirteenth resistor R13, a fourteenth resistor R14, a fifteenth resistor R15, a sixteenth resistor R16, a seventeenth resistor R17, an eighteenth resistor R18, a fourth capacitor C4, a fifth capacitor C5, a sixth capacitor C6 and a second optical coupler U2.

An anode of the second diode D2 connects to the mainboard 20, a cathode of the second diode D2 connects to one end of the twelfth resistor R12, one end of the fourth capacitor C4 and a base of the second triode Q2 through the eleventh resistor R11, another end of the twelfth resistor R12, another end of the fourth capacitor C4 and an emitter of the second triode Q2 are all grounded; a third pin of the second optical coupler U2 connects to one end of the sixteenth resistor R16, a cathode of the first Zener diode ZD1 and a base of the third triode Q3 through the fifteenth resistor R15; a fourth pin of the second optical coupler U2 connects to a collector of the third triode Q3 and the auxiliary path LLC control circuit 132; an emitter of the third triode Q3 connects to a collector of the fourth triode Q4 and one end of the eighteenth resistor R18; another end of the eighteenth resistor R18 connects to one end of the seventeenth resistor R17, a base of the fourth triode Q4 and a cathode of the second Zener diode ZD2; another end of the sixteenth resistor R16, an anode of the first Zener diode ZD1, another end of the fifth capacitor C5, another end of the seventeenth resistor R17, an anode of the second Zener diode ZD2 and one end of the sixth capacitor C6 are all grounded; an emitter of the fourth triode Q4 connects to the bridgeless PFC circuit 131 (applied to outputting the first power PFC_VCC), the second control sub-circuit 1112 and another end of the sixth capacitor C6.

The present embodiment, wherein the second triode Q2, the third triode Q3 and the fourth triode Q4 are all NPN triodes. The first Zener diode ZD1 and the second Zener diode ZD2 may protect the third triode Q3 and the fourth triode Q4. A model of the second optical coupler U2 is BPC-817C. The second diode D2, the eleventh resistor R11, the twelfth resistor R12 and the fourth capacitor C4 form a filter voltage dividing circuit, a divided voltage of the eleventh resistor R11 and the twelfth resistor R12 is a conduction voltage on the base of the second triode Q2, determining a conduction state of the second triode Q2, and the fourth capacitor C4 filters the conduction voltage. When the ON/OFF signal is high, at this time, the second triode Q2 is in saturation conduction condition, then the second optical coupler U2 is turned on, making the third triode Q3 and the fourth triode Q4 work, while the first control sub-circuit 1111 outputs the first power PFC_VCC and the second power VCC_VDD, making the bridgeless PFC circuit 131 and the auxiliary path LLC control circuit 132 start to work, so that the bridgeless PFC circuit 131 outputs the high-voltage direct current HV-DC to the second control sub-circuit 1112.

Figure 9:
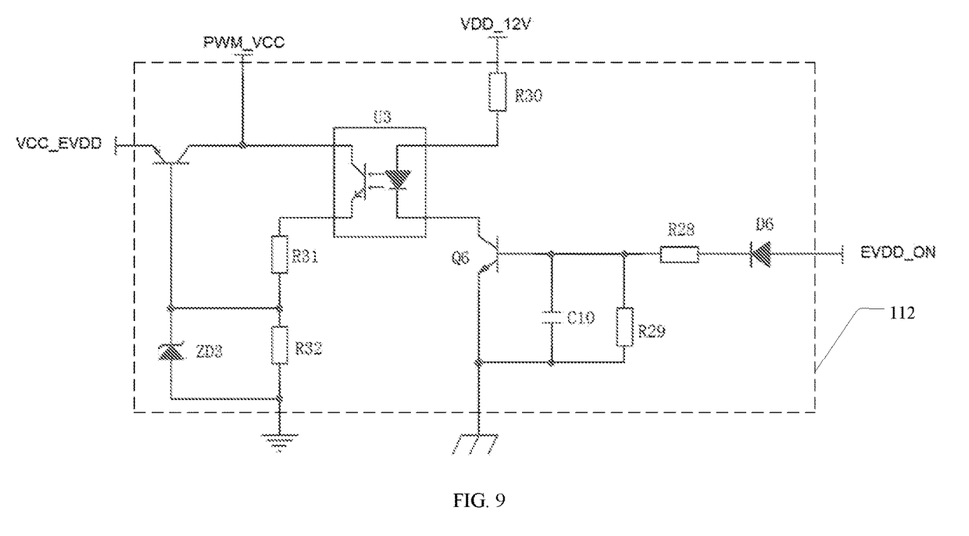
FIG. 9 illustrates a circuit diagram on an enabling switching circuit in the OLED drive power supply provided by the present disclosure.

Further, continuing referencing to FIG. 9, the second control sub-circuit 1112 comprises a nineteenth resistor R19, a twentieth resistor R20, a twenty-first resistor R21, a twenty-second resistor R22, a twenty-third resistor R23, a twenty-fourth resistor R24, a twenty-fifth resistor R25, a twenty-sixth resistor R26, a twenty-seventh resistor R27, a fifth triode Q5, a third diode D3, a fourth diode D4, a fifth diode D5, a seventh capacitor C7, an eighth capacitor C8, a ninth capacitor C9 and a second shunt reference source U12.

An emitter of the fifth triode Q5 connects to the first control sub-circuit 1111, further connects to one end of the twentieth resistor R20 and a negative electrode of the second shunt reference source U12 through the nineteenth resistor R19; a base of the fifth triode Q5 connects to a negative electrode of the second shunt reference source U12 through the twentieth resistor R20; a collector of the fifth triode Q5 connects to an anode of the fifth diode D5, further connects to an anode of the third diode D3 through the twenty-first resistor R21, a cathode of the fifth diode connects to the enabling switching circuit; a cathode of the third diode D3 connects to a cathode of the fourth diode D4, a feedback pin of the second shunt reference source U12, and further getting grounded through the seventh capacitor C7; a positive electrode of the second shunt reference source U12 is grounded; an anode of the fourth diode D4 connects to one end of the twenty-third resistor R23, one end of the eighth capacitor C18, one end of the ninth capacitor C19 and one end of the twenty-fourth resistor R24 through the twenty-second resistor R22; another end of the twenty-third resistor R23, another end of the eighth capacitor C8 and another end of the ninth capacitor C9 are all grounded; another end of the twenty-fourth resistor R24 connects sequentially to the twenty-fifth resistor R25, the twenty-sixth resistor R26 and the twenty-seventh resistor R27 in series, before connecting to the bridgeless PFC circuit 131 (to input the high-voltage direct current HV-DC).

In the present embodiment, wherein the fifth triode Q5 is a PNP triode, the twenty-fourth resistor R24, the twenty-fifth resistor R25, the twenty-sixth resistor R26 and the twenty-seventh resistor R27 form a resistive divider group, the nineteenth resistor R19 and the twentieth resistor R20 are mainly applied to adjusting a conduction state of the fifth triode Q5, the fifth diode D5 is mainly applied to separating and filtering, as well as stabilizing an output of the third power PWM_VCC, while the seventh capacitor C7 is mainly applied to filtering a smooth waveform. After the bridgeless PFC outputs the high-voltage direct current HV-DC to the second control sub-circuit 1112, the high-voltage direct current HV-DC passes through a resistive divider group before being divided into a voltage higher than 2.5V to the second shunt reference source U12, the second shunt reference source U12 is turned on to make the base of the fifth triode Q5 in a low level, making the fifth triode Q5 turn on, further making the second control sub-circuit 1112 output the third power PWM_VCC to the enabling switching circuit.

Further, referring to FIG. 9, the enabling switching circuit comprises a sixth diode D6, a twenty-eighth resistor R28, a twenty-ninth resistor R29, a thirtieth resistor R30, a thirty-first resistor R31, a thirty-second resistor R32, a tenth capacitor C10, a sixth triode Q6, a seventh triode Q7, a third Zener diode ZD3 and a third optical coupler U3.

An anode of the sixth diode D6 connects to the mainboard 20 (applied to inputting the second enabling signal EVDD-ON), a cathode of the sixth diode D6 connects to one end of the twenty-ninth resistor R29, one end of the tenth capacitor C10 and a base of the sixth triode Q6 through the twenty-eighth resistor R28, another end of the twenty-ninth resistor R29, another end of the seventh resistor R7 and an emitter of the sixth triode Q6 are all grounded; a collector of the sixth triode Q6 connects to a second pin of the third optical coupler U3, and a first pin of the third optical coupler U3 connects to the on-off control circuit through the thirtieth resistor R30, a third pin of the third optical coupler U3 connects to one end of the thirty-second resistor R32, a cathode of the third Zener diode ZD3 and a base of the seventh triode Q7 through the thirty-first resistor R31, a fourth pin of the third optical coupler U3 connects to the on-off control circuit and a collector of the seventh triode Q7; an emitter of the seventh triode Q7 connects to the second conversion module 14, while another end of the thirty-second resistor R32 and an anode of the third Zener diode ZD3 are both grounded The present embodiment, wherein the sixth triode Q6 and the seventh triode Q7 are both NPN triodes, the sixth diode D6, the twenty-eighth resistor R28 and the tenth capacitor C10 are mainly applied to filtering a plurality of interference signals in the second enabling signal EVDD-ON input and smoothing a waveform thereof. The thirty-first resistor R31 and the thirty-second resistor R32 are applied to adjusting a conduction state of the seventh triode Q7. A model of the third optical coupler U3 is BPC-817C. When the second enabling signal EVDD-ON is high, the sixth triode Q6 is in saturation conduction condition, making the third optical coupler U3 start to work, specifically, a third pin and a fourth pin of the third optical coupler U3 have a current passing through, while a base of the seventh triode Q7 establishes a current conduction, further converting the third power PWM_VCC into the fourth power VCC_ECVDD before outputting to the main LLC controller 141, the second transformer 142 is started by the main circuit controller according to the fourth power VCC_EVDD, the second transformer 142 converts the high-voltage direct current HV-DC output from the bridgeless PFC circuit 131 to the second enabling voltage EVDD_24V to power and light up the OLED screen 30.

Embodiment 2

Figure 10:
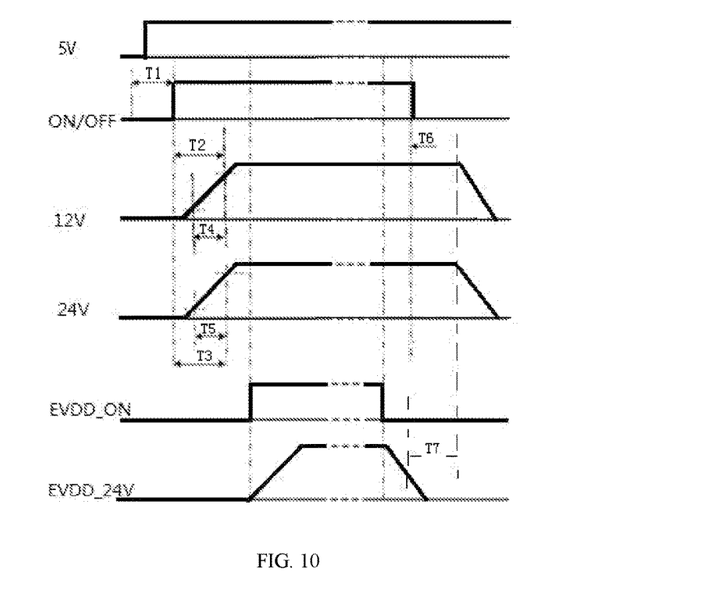
FIG. 10 illustrate an on-off timing diagram of the OLED drive power supply provided by the present disclosure.

Further, an on-off timing diagram of the OLED driving power supply provided by the present disclosure is shown in FIG. 10, and a detailed description of a starting process and a standby process of the OLED drive power supply provided by the present disclosure is shown in details below in a conjunction of FIG. 3-FIG. 10:

When starting to power, as long as a power cable is connected, the first conversion module 13 will have an output of about 10V and 18V, respectively. When a remote controller receives a power-on signal, the mainboard 20 will give out an ON/OFF signal at a high level, while a fifth triode is turned on, the power supply circuit 11 starts to supply power to the bridgeless PFC circuit 131, and the bridgeless PFC circuit 131 boosts a rectified voltage to about 400V. Also when the on/off signal ON/OFF is high, the standby step-down circuit starts to switch to a normal working mode, that is, the first triode Q1 is turned on, after about a T1 period, an output voltage of the first conversion module 13 rises from about 10V and 18V to a normal value of 12V and 20V, and the mainboard 20 starts to work normally. In order to light up the screen, the first enabling signal is output to the switch 12 after a T2 period, when the switch 12 is switched on, and converts 12V into VDD_12V to supply to the OLED screen 30 for power. However, to light up the OLED screen 30, requires two ways of voltage, thus after a T3 period, the mainboard 20 outputs a second enabling signal EVDD-ON after pulled-up, while a 400V high-voltage direct current HV-DC fed back by the bridgeless PFC circuit 131 turns on the fifth triode Q5 after being divided, making the PWM_VCC has a voltage, and the enabling switching circuit outputs the fourth power VCC_E-VDD to supply power to the main LLC control circuit, while combining the third power PWM_VCC output from the second control sub-circuit 1112, and the main LLC control circuit converts the high-voltage direct current HV-DC into the second enabling voltage EVDD_24V before outputting to the OLED screen 30, after a period of T4, an output from the second enabling voltage EVDD_24V is stable, and the OLED screen 30 is lit up.

When the mainboard 20 receives the standby signal, after a period of T5, the mainboard 20 will first pull the second enabling signal EVDD-ON down, the power supply circuit 11 will no longer supply power to the second conversion module 14, and the main circuit will no longer output the second enabling voltage EVDD_24V. Second, the first enabling signal of the mainboard 20 will also be pulled down, and the switch 12 will stop working, and no longer output the first enabling voltage VDD_12V. After one more period of T6, the mainboard 20 pulls the on-off signal ON/OFF down, the bridgeless PFC circuit 131 stops working, also the output voltages of 12V and 20V start to fall, and finally drop to 10V and 18V, respectively, so the bridgeless PFC circuit 131 stops working, making the OLED drive power supply enter a standby state, wherein the period of T6 is no less than 30 s.

Embodiment 3

The present disclosure further provides an OLED television, which comprises the OLED drive power supply described above, and due to the OLED drive power supply has been described above in details, no more descriptions are stated in details herein.

All above, the present disclosure provides a OLED drive power supply and an OLED television, the OLED drive power supply comprises a power supply board connected with a mainboard and an OLED screen, the power board comprises a power supply circuit, a first conversion module, a second conversion module and a switch. After powering on, the power supply circuit starts the first conversion module, to output a high-voltage direct current to the second conversion module, and output a first voltage and a second voltage to the mainboard for power, and the switch converts the first voltage into the first enabling voltage to the OLED screen for power; after a preset time, the mainboard outputs a second enabling signal to the power supply circuit, and the power supply circuit controls the second conversion module to start outputting a second enabling voltage to power and light up the OLED screen; wherein the first conversion module comprises a bridgeless PFC circuit and an auxiliary path LLC control circuit integrated in a same semiconductor chip package. By integrating the bridgeless PFC and the auxiliary path LLC control circuit into one control chip, and omitting a special standby circuit, a circuit structure is optimized, an area of the power supply board is reduced, and a production cost is reduced.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

INDUSTRIAL APPLICABILITY

The OLED drive power supply and the OLED television provided by the embodiments of the present disclosure, by integrating the bridgeless PFC and the auxiliary path LLC control circuit into one control chip, and omitting a special standby circuit, at a same time of satisfying a requirement of the OLED television on a power output stability and a timing control, a circuit structure is optimized, an area of the power supply board is reduced, and a production cost is reduced.

What is claimed is:

1. An OLED drive power supply, comprising: a power supply board connected with a mainboard and an OLED screen, wherein the power supply board comprises a power supply circuit, a first conversion module, a second conversion module and a switch; after powering on, the power supply circuit starts the first conversion module according to an on-off signal output from the mainboard, the first conversion module outputs a high-voltage direct current to the second conversion module, the first conversion module outputs a first voltage and a second voltage to supply power to the mainboard, and the switch converts the first voltage into a first enabling voltage before outputting to the OLED screen for power, according to a first enabling signal output from the mainboard; after a preset time, the mainboard outputs a second enabling signal to the power supply circuit, the power supply circuit controls the second conversion module to start according to the second enabling signal, the second conversion module converts the high-voltage direct current into a second enabling voltage to supply power to and light up the OLED screen; the first conversion module comprises a bridgeless PFC circuit and an auxiliary path LLC control circuit integrated in a same semiconductor chip package, the bridgeless PFC circuit starts and outputs a high-voltage direct current to the auxiliary path LLC control circuit, and the auxiliary path LLC control circuit converts the high-voltage direct current into the first voltage and the second voltage before outputting to the mainboard for power.

2. The OLED drive power supply according to claim 1, wherein the power supply circuit comprises an on-off control circuit and an enabling switching circuit, the on-off control circuit outputs a first power to start the bridgeless PFC circuit according to the on-off signal output from the mainboard, and outputs a second power to the auxiliary path LLC control circuit for power, and outputs a third power to the enabling switching circuit for power according to the high-voltage direct current output from the bridgeless PFC circuit; the enabling switching circuit converts the third power into a fourth power before outputting to the second conversion module according to the second enabling signal output from the mainboard.

3. The OLED drive power supply according to claim 2, wherein the auxiliary path LLC control circuit comprises an auxiliary path LLC controller and a first transformer, the auxiliary path LLC controller starts the first transformer according to the second power output from the on-off control circuit, and the first transformer converts the high-voltage direct current output from the bridgeless PFC circuit into the first voltage and the second voltage before outputting to the mainboard.

4. The OLED drive power supply according to claim 2, wherein the second conversion module comprises a main LLC controller and a second transformer, the main path LLC controller starts the second transformer according to the fourth power output from the enabling switching circuit, and the second transformer converts the high-voltage direct current output from the bridgeless PFC circuit into the second enabling voltage to power the OLED screen.

5. The OLED drive power supply according to claim 2, wherein the on-off control circuit comprises a first control sub-circuit and a second control sub-circuit, the first control sub-circuit outputs the first power to start the bridgeless PFC circuit according to the on-off signal output from the mainboard, and outputs the second power to the auxiliary path LLC control circuit, and the second control sub-circuit outputs the third power to the enabling switching circuit according to the high-voltage direct current output from the bridgeless PFC circuit.

6. The OLED drive power supply according to claim 5, wherein the first control sub-circuit comprises a second diode, a first Zener diode, a second Zener diode, a second triode, a third triode, a fourth triode, an eleventh resistor, a twelfth resistor, a thirteenth resistor, a fourteenth resistor, a fifteenth resistor, a sixteenth resistor, a seventeenth resistor, an eighteenth resistor, a fourth capacitor, a fifth capacitor, a sixth capacitor and a second optical coupler; an anode of the second diode connects to the mainboard, a cathode of the second diode connects to one end of the twelfth resistor, one end of the fourth capacitor and a base of the second triode through the eleventh resistor, another end of the twelfth resistor, another end of the fourth capacitor and an emitter of the second triode are all grounded; a third pin of the second optical coupler connects to one end of the sixteenth resistor, an anode of the first Zener diode and a base of the third triode through the fifteenth resistor; a fourth pin of the second optical coupler connects to a collector of the third triode and the auxiliary path LLC control circuit; an emitter of the third triode connects to a collector of the fourth triode and one end of the eighteenth resistor; another end of the eighteenth resistor connects to one end of the seventeenth resistor, a base of the fourth triode and a cathode of the second Zener diode; another end of the sixteenth resistor, an anode of the first Zener diode, another end of the fifth capacitor, another end of the seventeenth resistor, an anode of the second Zener diode and one end of the sixth capacitor are all grounded; an emitter of the fourth triode connects to the bridgeless PFC circuit, the second control sub-circuit and another end of the sixth capacitor.

7. The OLED drive power supply according to claim 6, wherein the second triode, the third triode and the fourth triode are all NPN triodes.

8. The OLED drive power supply according to claim 5, wherein the second control sub-circuit comprises a nineteenth resistor, a twentieth resistor, a twenty-first resistor, a twenty-second resistor, a twenty-third resistor, a twenty-fourth resistor, a twenty-fifth resistor, a twenty-sixth resistor, a twenty-seventh resistor, a fifth triode, a third diode, a fourth diode, a fifth diode, a seventh capacitor, an eighth capacitor, a ninth capacitor and a second shunt reference source; an emitter of the fifth triode connects to the first control sub-circuit, further connects to one end of the twentieth resistor and a negative electrode of the second shunt reference source through the nineteenth resistor; a base of the fifth triode connects to a negative electrode of the second shunt reference source through the twentieth resistor; a collector of the fifth triode connects to an anode of the fifth diode, further connects to an anode of the third diode through the twenty-first resistor, a cathode of the fifth diode connects to the enabling switching circuit; a cathode of the third diode connects to a cathode of the fourth diode, a feedback pin of the second shunt reference source, and further getting grounded through the seventh capacitor; a positive electrode of the second shunt reference source is grounded; an anode of the fourth diode connects to one end of the twenty-third resistor, one end of the eighth capacitor, one end of the ninth capacitor and one end of the twenty-fourth resistor through the twenty-second resistor; another end of the twenty-third resistor, another end of the eighth capacitor and another end of the ninth capacitor are all grounded; another end of the twenty-fourth resistor connects sequentially to the twenty-fifth resistor, the twenty-sixth resistor and the twenty-seventh resistor in series, before connecting to the bridgeless PFC circuit.

9. The OLED drive power supply according to claim 8, wherein the fifth triode is a PNP triode.

10. The OLED drive power supply according to claim 2, wherein the enabling switching circuit comprises a sixth diode, a twenty-eighth resistor, a twenty-ninth resistor, a thirtieth resistor, a thirty-first resistor, a thirty-second resistor, a tenth capacitor, a sixth triode, a seventh triode, a third Zener diode and a third optical coupler; an anode of the sixth diode connects to the mainboard, a cathode of the sixth diode connects to one end of the twenty-ninth resistor, one end of the tenth capacitor and a base of the sixth triode through the twenty-eighth resistor, another end of the twenty-ninth resistor, another end of the seventh resistor and an emitter of the sixth triode are all grounded; a collector of the sixth triode connects to a second pin of the third optical coupler, and a first pin of the third optical coupler connects to the on-off control circuit through the thirtieth resistor, a third pin of the third optical coupler connects to one end of the thirty-second resistor, a cathode of the third Zener diode and a base of the seventh triode through the thirty-first resistor, a fourth pin of the third optical coupler connects to the on-off control circuit and a collector of the seventh triode; and an emitter of the seventh triode connects to the second conversion module, while another end of the thirty-second resistor and an anode of the third Zener diode are both grounded.

11. The OLED drive power supply according to claim 10, wherein the sixth triode and the seventh triode are both NPN triodes.

12. The OLED drive power supply according to claim 1, wherein the auxiliary path LLC control circuit further comprises a standby step-down circuit, applied for controlling a magnitude of the first voltage and the second voltage output to the mainboard according to the on-off signal.

13. The OLED drive power supply according to claim 12, wherein the standby step-down circuit comprises a first diode, a first resistor, a second resistor, a third resistor, a fourth resistor, a fifth resistor, a sixth resistor, a seventh resistor, an eighth resistor, a ninth resistor, a tenth resistor, a first capacitor, a second capacitor, a third capacitor, a first triode, a first shunt reference source and a first optical coupler; an anode of the first diode connects to the mainboard, a cathode of the first diode connects to one end of the second resistor, one end of the first capacitor and a base of the first triode through the first resistor; another end of the second resistor, another end of the first capacitor and an emitter of the first triode are all grounded; a collector of the first triode connects to one end of the fourth resistor, one end of the fifth resistor, one end of the sixth resistor, a feedback pin of the first shunt reference source, one end of the second capacitor, one end of the third capacitor and one end of the seventh resistor through the third resistor; another end of the fourth resistor connects to the mainboard, another end of the seventh resistor connects to the OLED screen and one end of the tenth resistor; another end of the fifth resistor, another end of the sixth resistor and a positive electrode of the first shunt reference source are all grounded; a negative electrode of the first shunt reference source connects to another end of the second capacitor, one end of the eighth resistor, one end of the ninth resistor and a second pin of the first optical coupler; another end of the eighth resistor connects to another end of the third capacitor; another end of the ninth resistor connects to another end of the tenth resistor and a first pin of the first optical coupler; a third pin of the first optical coupler is grounded, and a fourth pin of the first optical coupler connects to the mainboard.

14. The OLED drive power supply according to claim 13, wherein, a model of the first optical coupler is BPC-817C.

15. An OLED television, wherein comprising the OLED drive power supply according to claim 1.

* * * * *